US009026124B2

(12) United States Patent
Smith

(10) Patent No.: US 9,026,124 B2
(45) Date of Patent: May 5, 2015

(54) SYSTEM AND METHOD FOR INTERFERENCE MITIGATION IN A WIRELESS COMMUNICATIONS SYSTEM

(75) Inventor: Jack Anthony Smith, Valley View, TX (US)

(73) Assignee: Futurewei Technologies, Inc., Plano, TX (US)

( * ) Notice: Subject to any disclaimer, the term of this patent is extended or adjusted under 35 U.S.C. 154(b) by 677 days.

(21) Appl. No.: 12/748,128

(22) Filed: Mar. 26, 2010

(65) Prior Publication Data

US 2010/0248737 A1 Sep. 30, 2010

Related U.S. Application Data

(60) Provisional application No. 61/165,325, filed on Mar. 31, 2009.

(51) Int. Cl.
*H04W 72/00* (2009.01)
*H04L 12/26* (2006.01)
*H04W 4/00* (2009.01)
*H04W 16/12* (2009.01)

(52) U.S. Cl.
CPC .................................. *H04W 16/12* (2013.01)

(58) Field of Classification Search
CPC .............................. H04W 24/00; H04W 28/04
USPC ...................................................... 455/452.2
See application file for complete search history.

(56) References Cited

U.S. PATENT DOCUMENTS

| 2004/0082364 | A1* | 4/2004 | Kitazawa et al. ............. 455/560 |
| 2005/0201332 | A1* | 9/2005 | Bakshi et al. ................. 370/333 |
| 2006/0014538 | A1* | 1/2006 | Yuan .............................. 455/436 |
| 2007/0042784 | A1* | 2/2007 | Anderson ...................... 455/450 |
| 2007/0042799 | A1 | 2/2007 | Jubin et al. |
| 2007/0249363 | A1 | 10/2007 | Amalfitano et al. |
| 2008/0188234 | A1* | 8/2008 | Gorokhov et al. ......... 455/452.2 |

(Continued)

FOREIGN PATENT DOCUMENTS

| EP | 1 942 686 A2 | 9/2008 |
| WO | WO 96/00466 A1 | 1/1996 |

(Continued)

OTHER PUBLICATIONS

Marsch, P., et al., "On Backhaul-Constrained Multi-Cell Cooperative Detection based on Superposition Coding," Personal, Indoor and Mobile Radio Communications, IEEE, Sep. 15-18, 2008, 5 pages.

Pischella, M., et al., "Achieving a Frequency Reuse Factor of 1 in OFDMA cellular networks with cooperative communications," IEEE, 2008, pp. 653-657.

Rahman, M., et al., "Interference Avoidance through Dynamic Downlink OFDMA Subchannel Allocation using Intercell Coordination," IEEE, 2008, pp. 1630-1635.

(Continued)

*Primary Examiner* — Lester Kincaid
*Assistant Examiner* — Andy Gu
(74) *Attorney, Agent, or Firm* — SLater & Matsil, L.L.P.

(57) ABSTRACT

A system and method for interference mitigation in a wireless communications system are provided. A method for interference mitigation in a controller includes coordinating with other controllers to establish a cooperative agreement, receiving information from a communications device served by the controller, scheduling a transmission opportunity for the communications device based on an indicator and the cooperative agreement, and receiving a transmission from the communications device at the scheduled transmission opportunity.

23 Claims, 7 Drawing Sheets

(56) References Cited

U.S. PATENT DOCUMENTS

| | | | |
|---|---|---|---|
| 2008/0205333 | A1 | 8/2008 | Cristian et al. |
| 2009/0023477 | A1* | 1/2009 | Staudte ............... 455/562.1 |
| 2009/0129327 | A1* | 5/2009 | Horn et al. ............ 370/329 |
| 2009/0232050 | A1* | 9/2009 | Shen et al. ............ 370/328 |
| 2009/0296635 | A1* | 12/2009 | Hui et al. ............ 370/328 |
| 2010/0039948 | A1* | 2/2010 | Agrawal et al. ............ 370/252 |
| 2010/0142466 | A1* | 6/2010 | Palanki et al. ............ 370/329 |

FOREIGN PATENT DOCUMENTS

| | | |
|---|---|---|
| WO | WO 02/28119 A2 | 4/2002 |
| WO | WO 2007/142939 A2 | 12/2007 |
| WO | WO 2009/035893 A1 | 3/2009 |

OTHER PUBLICATIONS

Sepko, B.J., et al., "A Study on Effect of Interference in Cooperative Communication," IEEE, 2008, pp. 651-654.

Supplementary European Search Report received in European Patent Application No. EP10758041 mailed Jul. 12, 2011, 12 pages.

Qualcomm Europe, "Signaling for spatial coordination in DL CoMP," R1-092057, 3GPP TSG-RAN WG1 #57, San Francisco, USA, May 4-8, 2009, 10 pages.

International Search Report and Written Opinion received in Patent Cooperation Treaty International Application No. PCT/CN2010/071404, mailed Jul. 8, 2010, 10 pages.

First Chinese Office Action with partial English translation received in Chinese Application No. 201080012844.8 mailed Mar. 27, 2013, 14 pages.

* cited by examiner

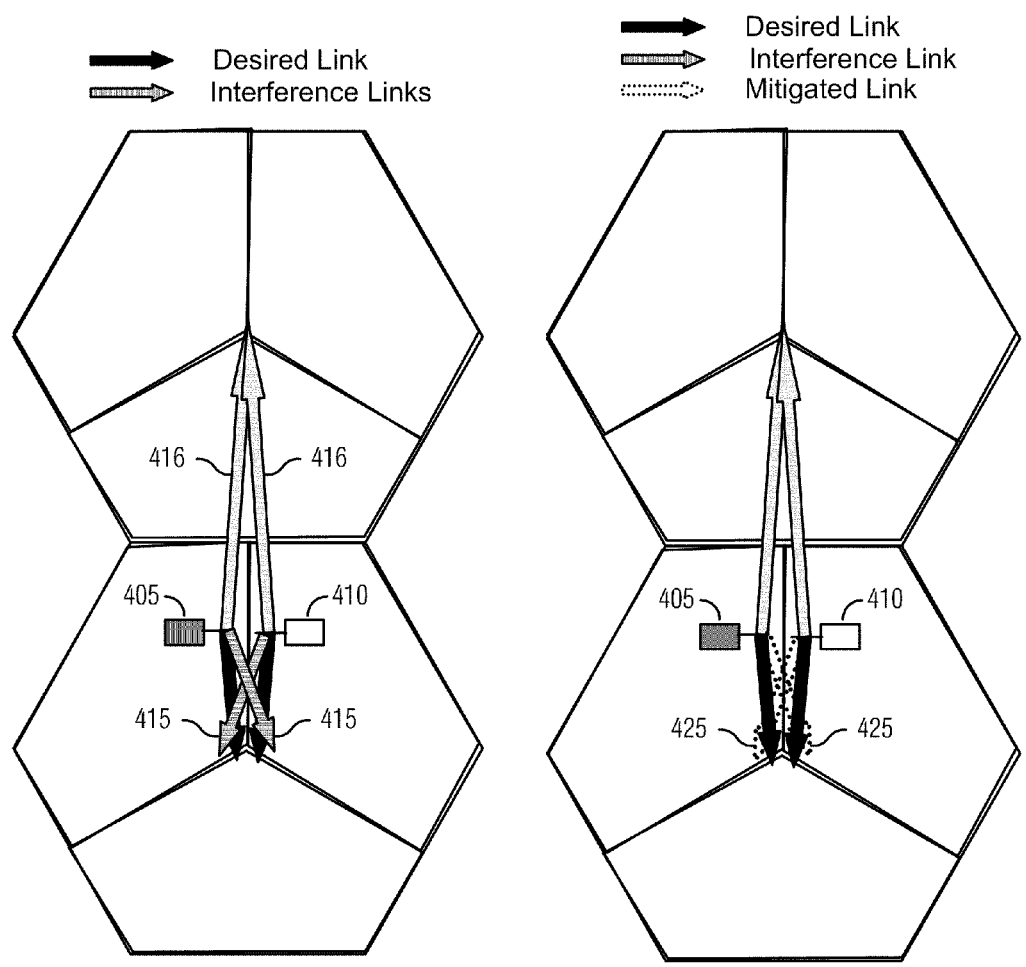
*Fig. 4a*  *Fig. 4b*

SYSTEM AND METHOD FOR INTERFERENCE MITIGATION IN A WIRELESS COMMUNICATIONS SYSTEM

This application claims the benefit of U.S. Provisional Application No. 61/165,325, filed on Mar. 31, 2009, entitled "System and Method for Interference Mitigation Using Transmission Thresholds in a Wireless Communications System," which application is hereby incorporated herein by reference.

TECHNICAL FIELD

The present invention relates generally to wireless communications, and more particularly to a system and method for interference mitigation in a wireless communications system.

BACKGROUND

Inter-cell interference (ICI) management is necessary to obtain maximum performance from a wireless communications system. One area of increased focus in recent years is the development of techniques that employ multi-cell coordination to reduce ICI. In most cases, it is highly desirable to keep coordination signaling between cells to a minimum for reasons of cost, complexity, and latency. For VoIP applications, it is also important to manage the uplink feedback due to the large number of connections that must be simultaneously supported.

Over the years, a variety of methods have been developed for reducing ICI or mitigating the impact of ICI. Some of the earliest techniques were designed for implementation primarily at the interference-producing cell in order to control the level of interference that was transmitted out of a cell. Probably the best-known example of this class of techniques is simple transmit power control (TPC) which attempted to reduce the level of interference reaching the co-channel cell by minimizing the transmit power within the serving cell to the minimum level required for acceptable performance. Another method that can arguably be placed in this category is fractional frequency reuse (FFR), where each frequency was only reused in non-adjacent cells in order to provide isolation between the co-channel cells and allow a transmitted signal to attenuate sufficiently before reaching its co-channel cell. Later, a group of methods were designed for implementation at the receiving cells in order to mitigate or cope with the interference that did arrive from out of a cell. Techniques falling into this category include interference averaging through the use of different subcarrier permutations or hopping patterns, successive interference cancellation (SIC), and certain MIMO techniques such as interference nulling.

SUMMARY

These technical advantages are generally achieved, by embodiments of a system and method for interference mitigation in a wireless communications system.

In accordance with an embodiment, a method for interference mitigation by a controller is provided. The controller is one of a plurality of controllers. The method includes coordinating with other controllers in the plurality of controllers to establish a cooperative agreement, and receiving a message from a communications device served by the controller. The message includes an indicator of operating conditions of the communications device. The method also includes scheduling a transmission opportunity for the communications device based on the indicator and the cooperative agreement, and receiving a transmission from the communications device at the scheduled transmission opportunity.

In accordance with another embodiment, a method for interference mitigation by a communications device is provided. The communications device is served by a serving controller that is one of a plurality of controllers. The method includes receiving configuration information from the serving controller, measuring channels between the communications device and controllers in a subset of the plurality of controllers, the subset including the serving controller, and computing a first indicator of operating conditions at the communications device based on the measured channels and the configuration information. The method also includes transmitting the first indicator to the serving controller, receiving a second indicator from the serving controller, the second indicator indicating an assigned transmission opportunity, and transmitting to the serving controller at the assigned transmission opportunity.

In accordance with another embodiment, a communications device is provided. The communications device includes a receiver coupled to an antenna, a transmitter coupled to the antenna, a measure channel unit coupled to the receiver, and a processor coupled to the measure channel unit. The receiver receives signals detected by the antenna, the transmitter transmits signals using the antenna, and the measure channel unit measures a quality of a channel between a controller and the communications device. The processor computes link gain imbalances for a plurality of channels based on an output of the measure channel unit, and computes an indicator based on the link gain imbalances and configuration information received from a controller serving the communications device.

An advantage of an embodiment is that ICI mitigation is performed at both a source of the interference as well as a receiver of the interference. The use of information from both ends of the interference to mitigate ICI as well application of ICI mitigation techniques at both ends of the interference may yield better results than performing ICI mitigation at only one end.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4a is a diagram of a first MS and a second MS located near a sector boundary, wherein the first MS and the second MS are transmitting on a same resource;

FIG. 4b is a diagram of a first MS and a second MS, wherein the first MS and the second MS are transmitting on a same resource with a cooperative ICI mitigation technique having been applied to transmissions in order to provide compatibility;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with sectorized cells and adjustable transmit power levels. The invention may be applied to a wide variety of wireless communications systems, such as the Third Generation Partnership Project (3GPP) Long Term Evolution (LTE), LTE-Advanced, WiMAX, and so on, compliant wireless communications systems.

Inter-cell interference (ICI) mitigation techniques that employ transmit power control (TPC), fractional frequency reuse (FFR), interference cancellation at a receiver, and so forth, produce some degree of ICI mitigation. A common characteristic in these ICI mitigation techniques is that the techniques are primarily designed to be used unilaterally at either the transmitting cell or the cell receiving the interference. Since ICI, by definition, involves the interaction of transmission between multiple cell-sites, logic would suggest that a joint approach (at both the transmitting cell and the cell receiving the interference) might offer some performance advantages over a unilateral approach. The joint approach has led to interest in recent years in exploring techniques that incorporate knowledge and/or actions from multiple cell-sites jointly when performing the interference mitigation.

Figure 1:
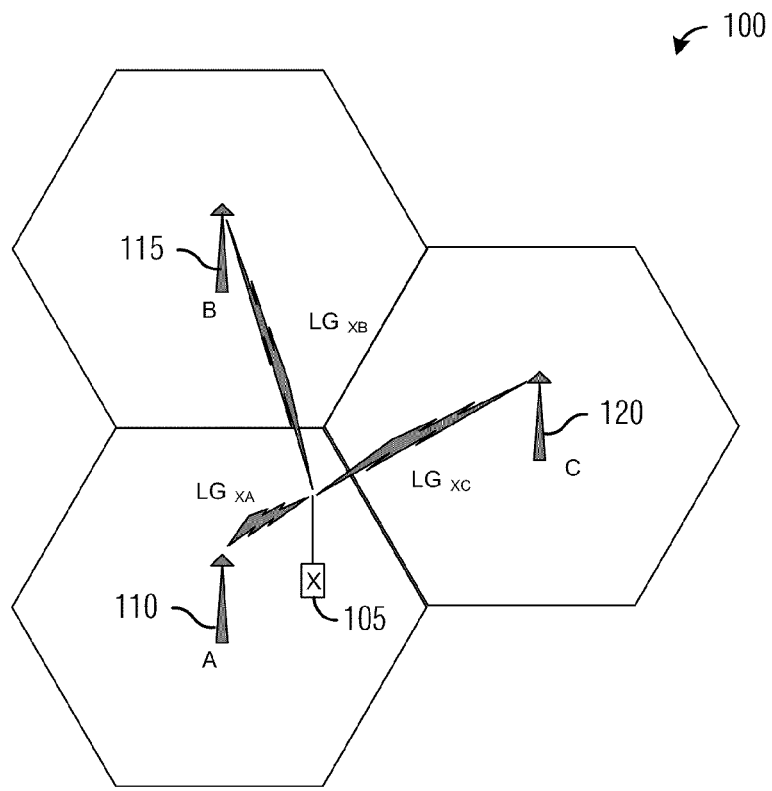
FIG. 1 is a diagram of a portion of a wireless communications system.

FIG. 1 illustrates a portion of a wireless communications system 100. Communications system 100 includes a mobile station (MS) 105 that is being serviced by a base station (BS) A 110. Transmissions made by MS 105 to BS A 110 may also arrive at a BS B 115 and a BS C 120, which may appear at BS B 115 and BS C 120 as a form of interference.

A received signal strength (RSS) at each of the BSs may be defined as:

$$RSS_A = ERP_X + LG_{XA} \quad (1)$$

$$RSS_B = ERP_X + LG_{XB} \quad (2)$$

$$RSS_C = ERP_X + LG_{XC} \quad (3)$$

where $ERP_X$ is the effective radiated power from MS X, and $LG_{X\beta}$ is the link gain between MS X and BS $\beta$, defined as:

$$LG_{X\beta} = G_{X \to \beta} + G_{\beta \to X} + SF_{X\beta} + PL_{X\beta} + FF_{X\beta}, \quad (4)$$

where $G_{X \to \beta}$ is defined as the effective transmit antenna gain at MS X in the direction of base $\beta$, $G_{\beta \to X}$ is defined as the effective receive antenna gain at base $\beta$ with respect to MS X, $SF_{X\beta}$ is the log-normally-distributed shadow fading component, $PL_{X\beta}$ is the distance-based mean pathloss, and $FF_{X\beta}$ is the multipath-based fast-fading component.

Equations (1)-(3) help to illustrate that when a MS performs a transmission that is received at its desired BS at a certain desired target level, the interference received at each of its neighboring BSs is only modified by the differences in the relative link gains. Power control, which is the only existing interference mitigation method that operates directly on $ERP_X$, does help to reduce overall interference, but when the link gain to one or more non-serving BSs is close to or equal to the link gain to the serving BS, the amount of uplink interference that results at the interfering cell is nearly as much as the amount of desired signal received at the serving BS. The newer non-TPC methods of interference mitigation have some merit since they have the ability to modify the individual component values (e.g., $G_X$, $G_\beta$, $PL_{X\beta}$) of the link gains in order to change the distribution of the link gain imbalances.

Because of the fundamental role that the link gain imbalances have on interference, link gain imbalance should be examined further. Begin by taking the various link gains and sorting them in descending order so as to obtain a vector of sorted descending-order link gains, $$SDLG = [LG_{X1}, LG_{X2}, LG_{X3}, \ldots, LG_{XM}] \quad (5)$$

where $LG_{X1}$ is the dB link gain between MS X and its desired server, $LG_{X2}$ is the dB link gain between MS X and the sector at which it (MS X) is producing the strongest interference, $LG_{X3}$ is the dB link gain between MS X and the sector at which it is producing the 2nd-strongest amount of interference, and so forth. Next, define the link gain imbalance, $LGI_{mn}$ as a difference between entries m and n in the SDLG vector. Specifically $LGI_{mn}$ is defined as:

$$LGI_{mn} = SDLG[m] - SDLG[n]. \quad (6)$$

Figure 2:
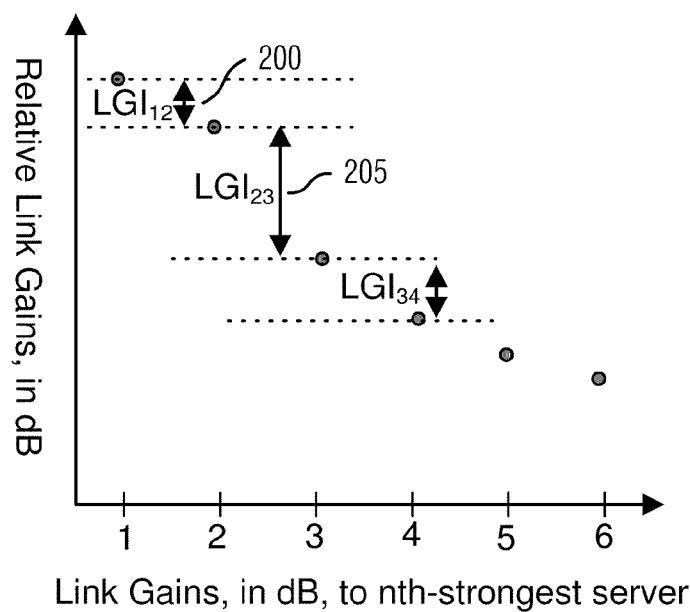
FIG. 2 is a plot of primary link gain imbalances.

FIG. 2 illustrates a plot of primary link gain imbalances. $LGI_{12}$ 200 is the link gain imbalance between the desired serving BS and the BS that receives the strongest interference signal. $LGI_{23}$ 205 represents the additional drop in interference that is received at the next-strongest interfering BS, i.e., the link gain imbalance between the BS that receives the strongest interference signal and the BS that receives the second strongest interference signal, and so on.

In the past, link gain imbalance $LGI_{12}$ 200 has been a main determining factor as to the level of interference introduced into the cellular system since it pertains to the cell receiving the most interference. Additional cells also receive some level of interference, but they receive the benefit of getting to experience the summation of all LGIs that precede it when determining their effective link gain imbalance.

As shown in FIG. 2, often the adjacent link gain imbalance $LGI_{23}$ will be much larger than $LGI_{12}$. The significant link gain imbalance difference naturally leads to a question of whether there is a way to exploit the larger $LGI_{23}$ link gain imbalance when it makes sense to do so. One way to do this is to use a methodology that produces compatibility between the two transmissions that occur at both of the cell-sites that are associated with $LGI_{12}$. In this way, link gain imbalance $LGI_{12}$ then becomes a non-issue and the "effective" interference introduced into the system then becomes dominated by link gain imbalance $LGI_{23}$.

As an example of the potential benefit of such a method, Table 1 contains a summary of the LGIs associated with a random sample of 20 MSs that were uniformly placed in a wrap-around universe using a standard cellular propagation model.

TABLE 1

LGIs associated with random sample of 20 MSs, uniformly dropped in a wraparound universe

| $LGI_{12}$ (dB) | $LGI_{23}$ (dB) | $LGI_{34}$ (dB) | $LGI_{45}$ (dB) |
|---|---|---|---|
| 14.42 | 2.50 | 20.99 | 2.53 |
| 9.77 | 4.52 | 2.22 | 0.07 |
| 19.56 | 0.00 | 4.27 | 0.68 |
| 1.61 | 7.01 | 0.64 | 1.84 |
| 19.99 | 0.00 | 5.35 | 5.86 |
| 1.68 | 5.15 | 1.49 | 2.85 |
| 2.91 | 3.36 | 1.41 | 6.36 |
| 15.01 | 0.43 | 1.94 | 0.86 |
| 14.16 | 3.54 | 1.19 | 0.18 |
| 11.98 | 0.42 | 7.60 | 0.00 |
| 16.46 | 2.57 | 0.00 | 0.56 |
| 0.46 | 6.98 | 0.18 | 0.05 |
| 2.24 | 2.76 | 2.34 | 0.32 |
| 2.25 | 8.33 | 1.69 | 0.81 |
| 2.42 | 3.56 | 4.72 | 2.12 |
| 0.63 | 4.88 | 1.55 | 3.37 |
| 10.62 | 0.97 | 0.19 | 2.13 |
| 13.39 | 3.21 | 2.99 | 5.59 |
| 14.01 | 1.59 | 1.19 | 0.36 |
| 4.31 | 0.85 | 3.36 | 4.73 |

Figure 3:
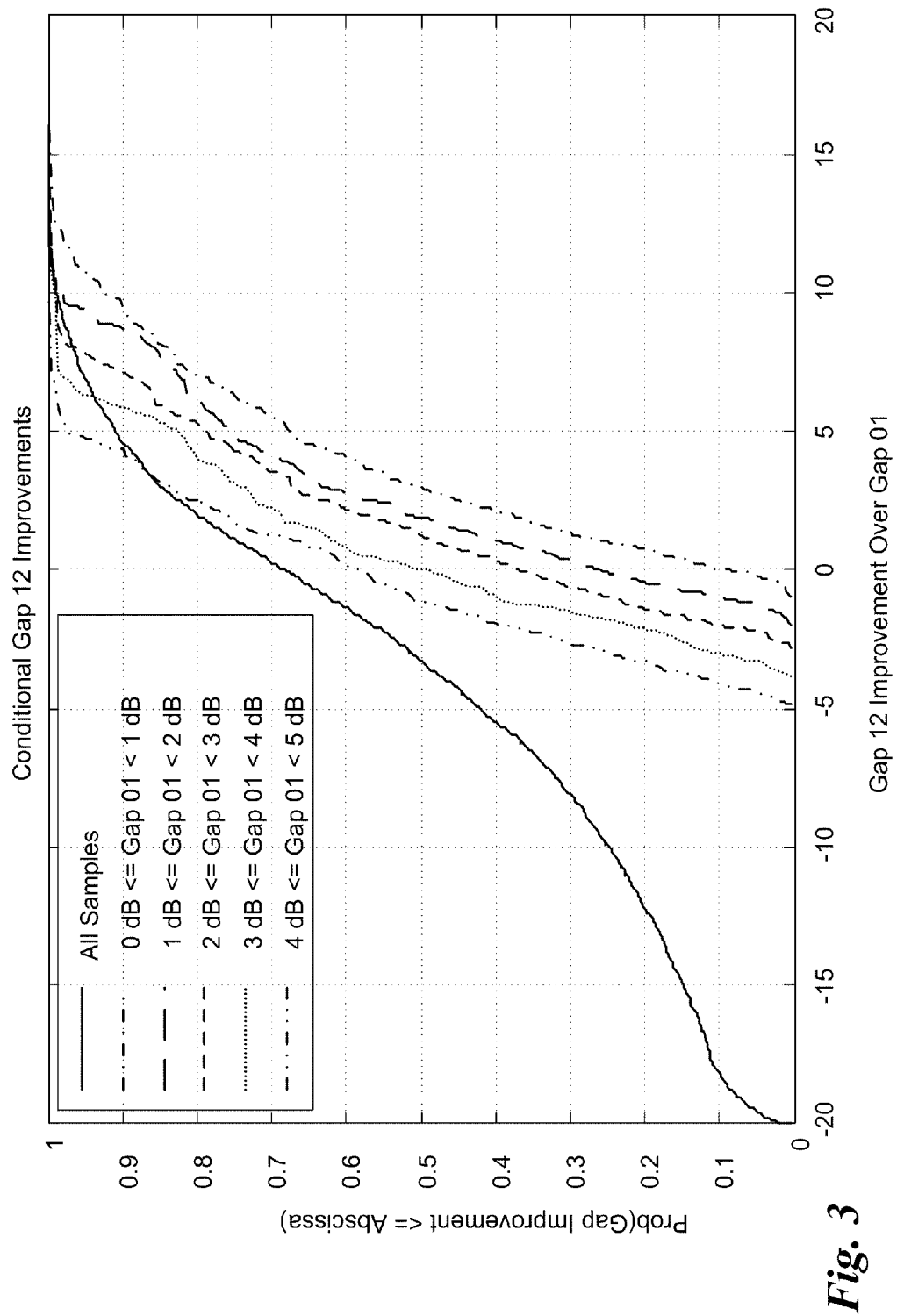
FIG. 3 is a plot of link gain imbalance $LGI_{12}$ and $LGI_{23}$ gaps as a function of probability of gap improvement for a communications system with a number of MSs.

As shown in Table 1, when $LGI_{12}$ is very small, there exists a high probability that $LGI_{23}$ will be larger. Oftentimes, the amount by which $LGI_{23}$ exceeds $LGI_{12}$ is 5 dB or greater. FIG. 3 illustrates a plot of link gain imbalance $LGI_{12}$ and $LGI_{23}$ gaps as a function of probability of gap improvement for a communications system with a number of MSs. As shown in FIG. 3, $LGI_{23}$ is larger than $LGI_{12}$ approximately 32% of the time when considering all samples. But more importantly, during those occurrences when $LGI_{12}$ is really small (i.e., the occurrences that dominate ICI creation) the probability that $LGI_{23}$ is larger increases substantially. For instance, when $LGI_{12}$ is less than 1 dB, the probability that $LGI_{23}$ is larger than $LGI_{12}$ is approximately 91%.

FIG. 4a illustrate a first MS 405 and a second MS 410 located near a sector boundary, wherein first MS 405 and second MS 410 are transmitting on a same resource. As shown in FIG. 4a, each MS produces strong interference (arrows 415) to neighboring sectors within its own respective cell, along with weaker interference (arrows 416) to a more distant facing sector in a neighboring cell.

FIG. 4b illustrates first MS 405 and second MS 410, wherein first MS 405 and second MS 410 are transmitting on a same resource with a cooperative ICI mitigation technique having been applied to transmissions in order to provide compatibility. As shown in FIG. 4b, the cooperative technique effectively mitigates the two strong interference paths (dotted arrows 425). The mitigation of the two strong interference paths leaves only the weaker interference paths as dominant mechanisms of uncontrolled interference.

Figure 5A:
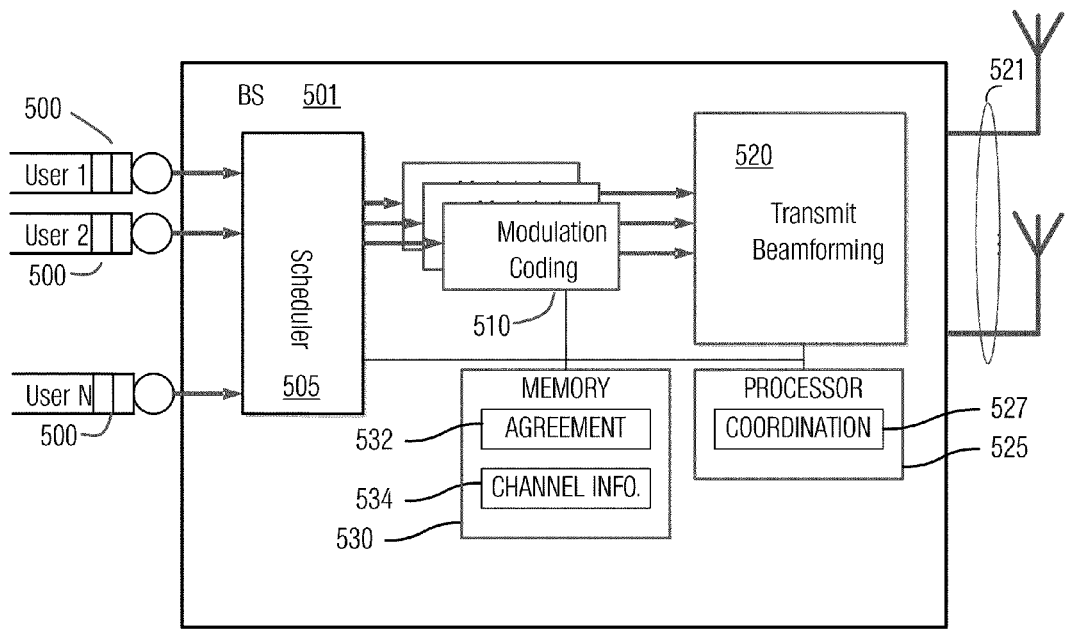
FIG. 5a is a diagram of a BS.

FIG. 5a illustrates a BS 501. Data 500 destined for a plurality of MSs being served by BS 501, in the form of bits, symbols, or packets, for example, may be sent to a scheduler 505, which may decide which user equipments (UEs) will transmit or receive in a given transmission opportunity. Scheduler 505 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) fedback from a plurality of MSs.

Data from MSs selected for reception (to receive a transmission from BS 501) may be processed by a modulation and coding block 510 to convert the data to transmitted symbols. Modulation and coding block 510 may also add redundancy for the purpose of assisting with error correction and/or error detection. A modulation and coding scheme implemented in modulation and coding block 510 may be chosen based in part on information about the channel quality information feedback (in the form of channel quality indicators or other short term information).

The output of modulation and coding block 510 may be passed to a transmit beamforming block 520, which maps the output (a modulated and coded stream for each MS) onto a beamforming vector. The beamformed outputs may be coupled to antennas 521 through RF circuitry, which are not shown. Although shown in FIG. 5a as having only two antennas, it should be understood that BS 501 may have any number of antennas.

Additionally, although transmit beamforming block 520 may beamform the output of modulation and coding block 510, transmit beamforming block 520 may also not beamform the output of modulation and coding block 510, based on control of a processor 525. The beamforming vectors used by transmit beamforming block 520 may be computed by processor 525 and provided to transmit beamforming block 520. Alternatively, a separate entity, such as a beamforming vector compute block may be used to compute the beamforming vectors.

In addition to controlling operations of modulation and coding block 510 and transmit beamforming block 520, processor 525 may also be used to perform ICI mitigation with a MS served by BS 501. Processor 525 may include a coordination block 527 that may be used to coordinate with different sectors within a communications system of which BS 501 is a member to establish a cooperative agreement. According to an embodiment, the cooperative agreement may be an agreement for various sectors within the communications system to divide up the individual sectors into subzones and specify different pilots to transmit, interference sectors to target, power control technique, transmission headroom, subzone type, and so forth. The cooperative agreement may be based on factors such as sector arrangement and configuration of the communications system, number of MSs in the communications system, number of BSs in the communications system, traffic type and load in the communications system, and so on. A discussion of the establishment of the cooperative agreement and details of an exemplary cooperative agreement is provided in detail below.

Once the cooperative agreement has been established, the cooperative agreement may be stored in a memory 530, for example, in an agreement store 532. In addition to storing the cooperative agreement for subsequent use in the scheduling of transmission opportunities for the MSs served by BS 501, memory 530 may also store channel information in a channel information store 534, for example, in the form of CQI reports from the MSs served by BS 501.

The channel information received from the MSs served by BS 501 in the form of feedback information may be used by scheduler 505 in conjunction with the cooperative agreement stored in memory 530 to schedule transmission opportunities for the MSs. For example, based on the channel information for a MS, scheduler 505 may elect to grant a transmission opportunity for the MS as well as specify which subzone the MS is to operate in, wherein the subzone specification is based upon the cooperative agreement. A description of the operation of scheduler 505 is provided in detail below.

Although scheduler 505 is shown as a separate unit of BS 501, scheduler 505 may be implemented as part of processor 525. Therefore the discussion of separate scheduler 505 and processor 525 should not be construed as being limiting to either the scope or spirit of the embodiments.

Figure 5B:
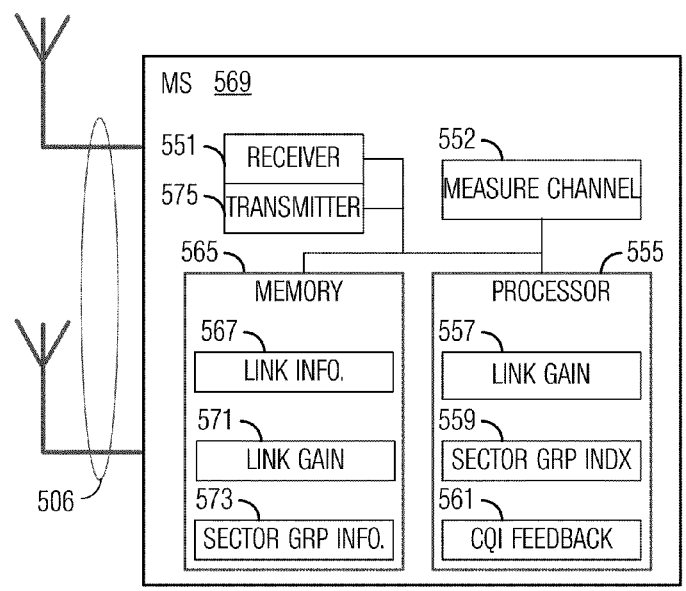
FIG. 5b is a diagram of a MS.

FIG. 5b illustrates a MS 569. MS 569 may have one or a plurality of receive antennas 506, connecting through RF circuitry (not shown) to a receiver 551. Receiver 551 may be used to receive signals detected by receive antenna 506. MS 569 also includes a measure channel block 552 that may be used to measure a channel between MS 569 and a BS serving MS 569, such as BS 501. Measure channel block 552 may make use of a pilot or some other reference signal transmitted by the BS in its channel measurements.

Furthermore, measure channel block 552 may also measure channels between MS 569 and other cells (BSs) operating in a general vicinity, with the measurement for each channel being based on a pilot (or some other reference signal) transmitted by the other cells. According to an embodiment, the BS may transmit a general pilot for more than one MS or the BS may transmit a specific pilot for use by a single MS. According to an embodiment, measure channel block 552 may measure a signal to noise ratio (SNR) of the channel. Alternatively, measure channel block 552 may measure a signal plus interference to noise ratio (SINR) of the channel. According to an alternative embodiment, measure channel block 552 may be a part of receiver 551.

MS 569 also includes a processor 555, and a memory 565. Processor 555 may be used to control operations of MS 569. Measurements of the channels may be stored in a link information store 567 of memory 565. Additionally, processor 555 may include a link gain block 557, a sector group index block 559, and a CQI feedback block 561. Link gain block 557 may be used to compute link gain differences from channel measurements made by measure channel block 552, which may be saved in link gain store 571 of memory 565.

Sector group index block 559 may be used to sort the link gain information computed by link gain block 557. As an example, the link gain information may be sorted in descending order or ascending order. Sector group index block 559 may also be used to create a vector that contains a sector group index for each entry in sorted link gain information. Information computed by sector group index block 559 may be stored in sector group information store 573 of memory 565. CQI feedback block 561 may be used to determine an appropriate CQI feedback by determining the minimum feedback value that corresponds to a specified logical expression. Output of CQI feedback block 561 may then be fedback to the BS by transmitter 575. A discussion of link gain block 557, sector group index block 559, and CQI feedback block 561 is provided in detail below.

A number of different techniques can be used to achieve some level of compatibility between transmissions. For instance, pseudo-FFR techniques based on transmission power limitations is one option. Another would be the use of coordinated beam switching such that a user in a first cell is served simultaneously to a user in a second cell, with both being outside the main beam of the other cell's patterns. SIC techniques are still another possibility. According to an embodiment, a technique assumed is a variation of uplink collaborative multiple-input, multiple output (MIMO) coupled with power-limited FFR.

In order to simplify the discussion of the detailed description, a specific set of system assumptions will be used. These same assumptions will apply below where the simulation results are discussed. However, these specific assumptions aren't necessarily requirements, but merely help to provide an accurate description of the communications system as the embodiments are discussed. The same technique, or a variation of it, can be applied in a variety of scenarios with different assumptions, including the choice of cooperative scheme. The detailed assumptions are summarized in Table 2.

TABLE 2

| System Assumptions | |
| --- | --- |
| UL Air Interface | OFDMA |
| System Layout | 19-cell, 3-sector wrap-around universe |
| Site-to-Site Distance | 1.5 km |
| # of TX antennas at each MS | 1 |
| # of RX antennas at each sector | 2 |
| System Bandwidth | 10 MHz |
| Duplex Type | TDD |
| Frame Duration | 5 ms (48 symbols) |
| Uplink Duration | 24 symbols |
| Uplink Frame Structure | 4 subframes (6 symbols each), independently scheduled |
| Subframe Structure | 48 separate distributed resource units (DRUs) of size 6 symbols by 18 subcarriers |
| DRU Structure | Each DRU includes 3 tiles each and contains two different pilot patterns. Each pilot pattern consumes 4 symbols per tile. |
| Receiver Type | MMSE |

Figure 6:
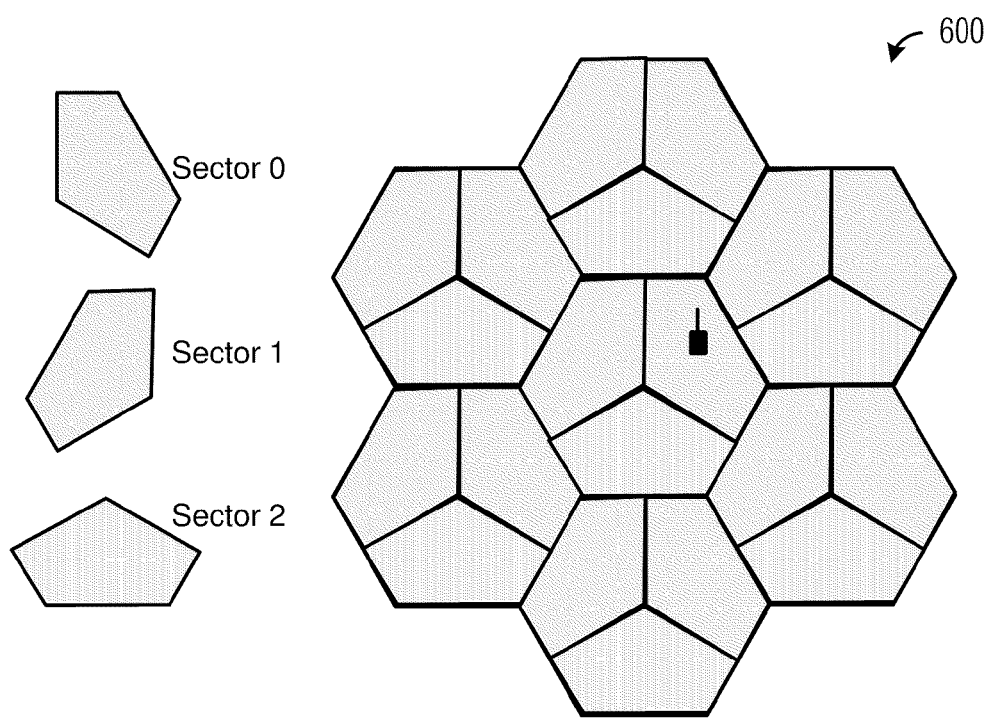
FIG. 6 is a diagram of a portion of wireless communications system, wherein the wireless communications system is a 19-cell, three-sector wraparound universe.

FIG. 6 illustrates a portion of wireless communications system 600, wherein wireless communications system 600 is a 19-cell, three-sector wraparound universe. Each sector is assumed to operate using the same set of time-frequency resources. The uplink frame includes four different subframes, each with a total of 48 distributed resource units (DRUs). The set of 48 logical DRUs is divided into 3 zones, each with two subzones. Each sector uses the same set of subcarriers for each of the six subzones. Table 3 summarizes the six subzone definitions.

TABLE 3

| Subzone Definitions Used at Each Sector | |
| --- | --- |
| Subzone | Corresponding DRUs |
| 1A | 1-12 |
| 1B | 13-16 |
| 2A | 17-28 |
| 2B | 29-32 |
| 3A | 33-44 |
| 3B | 45-48 |

Each DRU is composed of three tiles distributed across the total system bandwidth. Each tile measures six subcarriers by six symbols and contains two pilot set patterns (A&B), with each pilot set pattern consuming four tones per tile. The actual logical-to-physical tile permutation used at a sector may be different for each subzone, but must be performed using the same set of physical tiles.

Although the discussion focuses on a communications system with a number of cells, wherein each cell is divided into three sectors, the embodiments are operable in a communications system wherein the cells are divided into any number of sectors, such as two, three, four, five, and so forth. Additionally, the cells within the communications system are divided into an equal number of sectors, however, the embodiments are operable in a communications system wherein the cells are divided into a different number of sectors. Therefore, the discussion of three-sector cells should not be construed as being limiting to either the scope or the spirit of the embodiments.

Figures 7A, 7B:
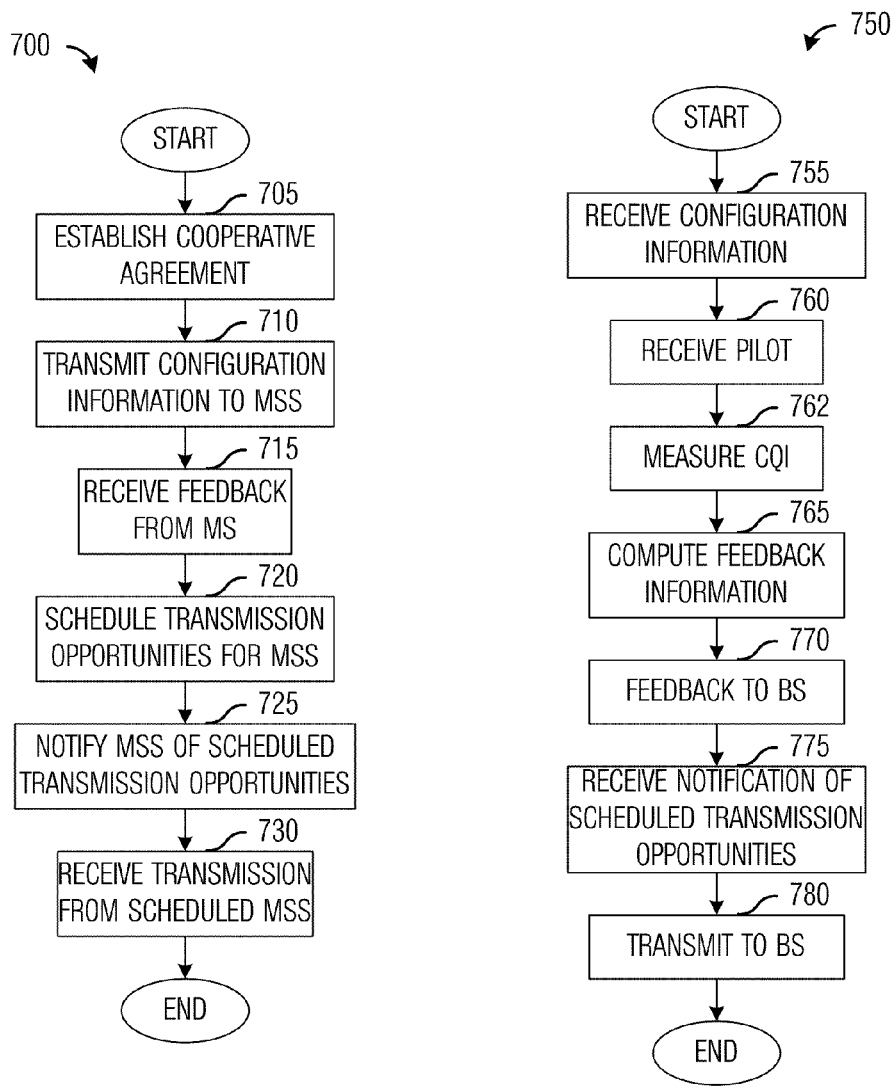
FIG. 7a is a flow diagram of BS operations in a reception of transmissions of information from MSs served by the BS with ICI mitigation.
FIG. 7b is a flow diagram of MS operations in a transmission of information to a BS that serves the MS with ICI mitigation.

FIG. 7a illustrates a flow diagram of BS operations 700 in a reception of transmissions of information from MSs served by the BS with ICI mitigation. BS operations 700 may be indicative of operations occurring in a BS, such as BS 501, as the BS receives information from MSs, such as MS 569, served by the BS in a communications system containing both the BS and the MS. BS operations 700 may occur while the BS is in a normal operating mode and the MS has information to send to the BS.

BS operations 700 may begin with the BS coordinating with other BSs in the communications system to establish a cooperative agreement between the BSs in the communications system (block 705). The establishing of the cooperative agreement may be based on factors including an arrangement of the communications system, a sectoring of a coverage area of the BSs, communications system resource configuration, transmit power configuration, ICI mitigation technique configuration, and so forth. For illustrative purposes, the discussion will assume that the cells of the communications system are arranged into three-sector cells, with all of the cells having the same three-sector arrangement.

According to an embodiment, the establishment of the cooperative agreement may begin with first dividing the sectors into three groups. Furthermore, each sector group may be partitioned into six subzones: 1A, 1B, 2A, 2B, 3A, and 3B. Using FIG. 6 as a reference, let sector group zero ("0") correspond to all sectors displayed using sector orientation zero, sector group one ("1") correspond to all sectors displayed using sector orientation one, and sector group two ("2") correspond to all sectors displayed using sector orientation two. After the definition of the sector groups, a cooperative agreement may be applied. Table 4 illustrates an exemplary cooperative agreement.

Table 4 may be illustrative of an exemplary cooperative agreement between sector groups in the communications system and may specify how MSs will be scheduled based on their CQI feedback. Table 4 also includes information on how open loop power control is to be performed at the MSs. As shown, each element of Table 4 contains five values:

1. A first value of an element indicates whether the MS should use pilot pattern A or pilot pattern B when performing transmissions in that subzone;

2. A second value of an element indicates which interfering sector should be targeted by the MS when performing open loop power control; A value of 1 indicates that the MS should power control to the dominant interference sector, whereas a value of 2 indicates that the MS should power control to the next-most dominant interference sector;

3. A third value of an element indicates the transmission headroom that should be applied if the scheduled allocation is in the default subzone for the supplied MS feedback;

4. A fourth value of an element indicates the transmission headroom that should be applied if the scheduled allocation is in an alternate subzone relative to that appropriate for its feedback; and 5. A fifth value of an element indicates a subzone type. Valid types include N (Normal), C (Cooperative), F (FFR), and L (Low power).

Configuration information, such as portion of the cooperative agreement (including pilot information, interference sectors, and so on), and subzone definitions may be periodically transmitted to the MSs served by the BS (block 710). Alternatively, the configuration information may be conveyed at call origination and/or handoff. Each MS may then have knowledge of the configuration information. Compression may be used to help reduce transmission overhead.

The BS may receive feedback information from the MSs that it is serving (block 715). According to an embodiment, the feedback information from the MSs comprises a number of bits of information selected based on a logical expression that may be descriptive of each MS' multi-sector geometry in detail. The logical expression may be one or more logical relationships that may be evaluated to determine a MS' multi-sector geometry. The logical expression may depend on factors such as a configuration of the communications system, arrangement of the cells, and so forth. Examples of logical expressions are provided below. For example, if a MS feedbacks a three-bit value equal to "000," then the MS' multi-sector geometry may be such that $LGI_{12} >= c_0$ where $c_0$ is a specified constant. A description of the MS feedback information is provided in detail below.

The BS may schedule transmission opportunities for the MSs that provide feedback information and have information to transmit (block 720). A variety of techniques may be used to schedule transmission opportunities for the MSs. According to an embodiment, a scheduling technique may include sorting the MSs first by the feedback code that is fedback by the MSs, then by estimated packet time-of-arrival, prior to scheduling the MSs. The scheduling of the MSs may then be performed so that those feedback classes that have the most flexibility in their assignment may be scheduled last so that scheduling the MSs may fill the resource holes left by the scheduling of previously scheduled feedback classes. A preferred order of scheduling is summarized in Table 5, wherein for clarity, it is assumed that the scheduling is being performed for a sector that belongs to sector group 0.

TABLE 4

Cooperative Agreement

| Sector Group Index | 1A | 1B | 2A | 2B | 3A | 3B |
|---|---|---|---|---|---|---|
| 0 | A, 2, $P_{01}$, $S_{01}$, C | A, 2, $P_{02}$, $S_{02}$, F | B, 2, $P_{03}$, $S_{03}$, C | B, 2, $P_{04}$, $S_{04}$, F | A, 1, $P_{05}$, $S_{05}$, N | A, 1, $P_{06}$, $S_{06}$, L |
| 1 | A, 1, $P_{11}$, $S_{11}$, N | A, 1, $P_{12}$, $S_{12}$, L | A, 2, $P_{13}$, $S_{13}$, C | A, 2, $P_{14}$, $S_{14}$, F | B, 2, $P_{15}$, $S_{15}$, C | B, 2, $P_{16}$, $S_{16}$, F |
| 2 | B, 2, $P_{21}$, $S_{21}$, C | B, 2, $P_{22}$, $S_{22}$, F | A, 1, $P_{23}$, $S_{23}$, N | A, 1, $P_{24}$, $S_{24}$, L | A, 2, $P_{25}$, $S_{25}$, C | A, 2, $P_{26}$, $S_{26}$, F |

TABLE 5

Preferred Scheduling Order and Subzones

| Scheduling Order | Feedback Code | Preferred Subzone | Alternate Subzones |
|---|---|---|---|
| $1^{st}$ | 100 | 2B | none |
| $2^{nd}$ | 101 | 1B | none |
| $3^{rd}$ | 010 | 2A | 2B |
| $4^{th}$ | 011 | 1A | 1B |
| $5^{th}$ | 111 | 3A | none |
| $6^{th}$ | 110 | 3A | none |
| $7^{th}$ | 000 | 3A | 1A, 1B, 2A, 2B, 3B |
| $8^{th}$ | 001 | 3A | 1A, 1B, 2A, 2B, 3B |

Due to the flexibility in using alternate scheduling subzones for many of the different feedback codes, the effective frequency reuse of the method is very close to one, even though FFR zones have been established.

The BS may provide information regarding the scheduled MSs and their respective transmission opportunities to the MSs (block 725). According to an embodiment, the BS may transmit a message containing the allocated transmission opportunities to the MSs over a control channel shared by the MSs. Alternatively, each MS may receive a separate message to inform it of its allocated transmission opportunity. The BS may then receive transmissions from the MSs at the MSs respective transmission opportunities (block 730) and BS operations 700 may then terminate.

FIG. 7b illustrates a flow diagram of MS operations 750 in a transmission of information to a BS that serves the MS with ICI mitigation. MS operations 750 may be indicative of operations occurring in a MS, such as MS 569, as the MS transmits information to a BS, such as BS 501, served by the BS in a communications system containing both the BS and the MS. MS operations 750 may occur while the MS is in a normal operating mode and has information to transmit to the BS.

MS operations 750 may begin with the MS receiving configuration information from the BS (block 755). The configuration information may include information related to a cooperative agreement established between the BSs in the communications system as well as subzone information.

The MS may receive a pilot from the BS (block 760). Alternatively, instead of the pilot, the MS may receive a reference sequence transmitted by the BS. The MS may measure a channel between itself and the BS (block 762). According to an embodiment, the MS may measure the SNR or the SINR of the channel. Additionally, the MS may measure channels between itself and other BSs operating in the vicinity. For example, the MS may measure channels between itself and BSs with coverage areas that are immediately adjacent to a coverage area of its serving BS, i.e., neighboring BSs. Furthermore, the MS may measure channels between itself and every detectable BS and then elect to discard channel measurements that are below a threshold.

It may be assumed that the MS has the ability to measure the average link gains independently between itself and the strongest few sectors in each sector group. The link gains may then be sorted in descending order to obtain vector SDLG as defined in Equation (5). The MS may also create a vector which contains the sector group index for every entry in vector SDLG. The vector containing the sector group index for every entry in vector SDLG is defined as $$SGI = [s_0, s_1, s_2, s_3, \ldots, s_M], \quad (7)$$

where $s_i$ indicates the sector group associated with the i-th entry in vector SDLG. In the event that the serving sector does not correspond to the first entry in the vector, both vector SDLG and SGI are rearranged by translating the serving sector to the first entry location. Once the two vectors have been computed, the MS also computes the vector of LGI values as described by Equation (6).

Once SGI and LGI are computed, the MS determines the appropriate CQI feedback by determining the minimum feedback value that corresponds to a successfully evaluated logical expression as described in Table 5 (block 765). Exemplary entries in Table 6 allow the MS to feedback a three-bit value that describes its current multi-sector geometry conditions in detail. Table 6 also illustrates several exemplary logical expressions that may be applicable to the communications system as described herein.

TABLE 6

CQI Feedback Determination Table

| Feedback Value | Logical Expression | Preferred Zone Type |
|---|---|---|
| 000 | $LGI_{12} \geq c_0$ | N |
| 001 | $LGI_{12} \geq c_1$ | N |
| 010 | $LGI_{12} < c_3, LGI_{12} > c_3,$ $s_1 = \mod(s_0 + 1, 3)$ | C |
| 011 | $LGI_{12} < c_3, LGI_{23} > c_3,$ $s_1 = \mod(s_0 + 2, 3)$ | C |
| 100 | $LGI_{12} < c_3, LGI_{23} < c_3,$ $s_1 = \mod(s_0 + 1, 3)$ $s_2 = \mod(s_0 + 2, 3)$ | F |
| 101 | $LGI_{12} < c_3, LGI_{23} < c_3,$ $s_1 = \mod(s_0 + 2, 3)$ $s_2 = \mod(s_0 + 1, 3)$ | F |
| 110 | $LGI_{12} \geq c_2$ | N |
| 111 | $LGI_{12} < c_2$ | N |

An overall goal of the technique is to partition the MSs into a number of broad categories (three categories are shown in Table 6). Category 1 includes all MSs that have a poor $LGI_{12}$ value, but a good $LGI_{23}$ value. These MSs may be targeted for pairing with an equivalent MS in the associated sector of dominant interference. Category 2 includes all MSs that have both poor $LGI_{12}$ and poor $LGI_{23}$ values, but the two dominant interference sectors are in different sector groups. These MSs may be targeted for pairing with an equivalent MS in the associated sector of dominant interference using an FFR subzone to eliminate the additional strong interference link. Category 3 includes all MSs that do not fall into Category 1 or Category 2.

The information in Table 6 allows the MS to determine which category it best resides and suggests the best subzone for scheduling. Even though there is no guarantee that the channels corresponding to the two MSs will be conducive to the use of collaborative spatial multiplexing, the use of hybrid automatic repeat request (HARM) allows for poor pairings to take place on individual transmissions. Plus, each DRU actually includes three different tiles distributed across the bandwidth which are likely paired with three different MSs. Thus, a sort of channel hopping and MS hopping takes place.

In another embodiment, the use of additional pilot patterns or equivalent orthogonality mechanisms may enable cooperation between more than two sectors at the same time. For example, using four different pilot patterns would allow four MSs in four different sector groups to be paired in a similar approach as to that depicted in FIG. 4b. In yet another such embodiment, it is possible to aggregate adjacent entries in vector SGI that are identical when performing the CQI feedback determination or the setting of the transmit power control levels. An example of this would be the case where a MS went through the CQI determination table and selected an entry of 100, indicating that both $LGI_{12}$ and $LGI_{23}$ correspond to poor link gaps.

In an embodiment, the MS would normally be assigned to preferred subzone 2B in a process described below and would power control to the 2nd dominant interfering sector. However, if both the 2nd dominant interfering sector and the 3rd dominant interfering sector belong to the same sector group, then in this alternate embodiment, the MS could power control to the 3rd dominant interfering sector.

Once the CQI is determined using Table 6, the three-bit code may be transmitted to the BS (block 770). Because the code is fairly slow-changing (i.e., mostly a function of changing shadow fading and link distances), a fairly-low feedback rate should suffice. One possibility for VoIP applications is to use the VoIP packets themselves as the dominant feedback mechanism. During the transmission of each VoIP packet, the MS would append both the three-bit code, along with a one-bit code that provides an indication of current VoIP status (0=active state, 1=inactive state) that can be used in setting the allocation period. Additional ad-hoc feedback can be used as supplements when necessary. For instance, to handle the case of lost feedback due to unsuccessful packets, the BS could either request a standalone feedback transmission or simply provide bandwidth for the MS to transmit a packet using the last-known transmission state. To handle inactive-to-active state transitions (which produce a change in the allocation period), BW allocations could be provided for MS-initiated indications using an ALOHA-based or other similar contention-based approach.

The MS may receive a notification of a transmission opportunity that has been allocated to the MS (block 775). At the occurrence of the transmission opportunity, the MS may transmit to the BS (block 780) and MS operations 750 may then terminate.

The final component may be the open-loop power control routine used at the MSs. Included with the notification of a transmission opportunity, each of the scheduled MSs may receive an assignment to an appropriate subzone where it could perform transmissions while creating a minimum interference to the communications system. When the MS performs the CQI determination that is summarized in Table 6, the MS knows the preferred zone type that it should be assigned. When the MS receives its assignment, it also knows the type of zone to which that assignment corresponds. The MS can then perform its open-loop power control routine using the appropriate target sector and back-off factor as conveyed in Table 4 in order to minimize its ICI impact to the system.

Figure 8:
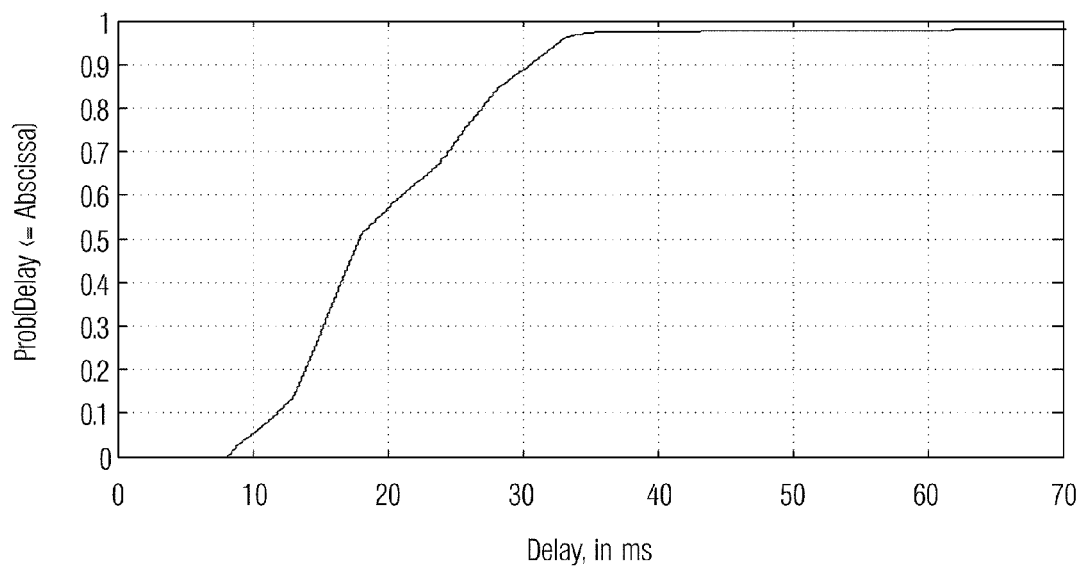
FIG. 8 is a plot of a delay curve for a loading rate of 108 users/MHz, assuming an EVRC vocoder is used.

An embodiment described above was applied to a VoIP system simulation using the assumptions of Table 2. For simplicity, algorithm values of $c_0=14.5$ dB, $c_1=6.5$ dB, $c_2=1.2$ dB, $c_3=3.0$ dB, $P_{ij}=3.0$ dB, and $S_{jk}=6.0$ dB for the low-power subzones and $S_{jk}=3.0$ dB for the remaining subzones. No optimization was performed. Hybrid ARQ was employed with extended subframes employed. A maximum of 4 transmissions were allowed, with retransmissions allowed every 5 ms. FIG. 8 illustrates a plot of a delay curve for a loading rate of 108 users/MHz, assuming an enhanced variable rate codec (EVRC) vocoder is used.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for interference mitigation by a controller, wherein the controller is one of a plurality of controllers, the method comprising:
    coordinating with other controllers in the plurality of controllers to establish a cooperative agreement, wherein the cooperative agreement specifies a transmit power configuration;
    receiving a message from a communications device served by the controller, wherein the message comprises an indicator of operating conditions of the device;
    scheduling a transmission opportunity for the communications device in accordance with the indicator and the cooperative agreement; and
    receiving a transmission from the communications device at the scheduled transmission opportunity, wherein the controller operates in a communications system,
    wherein the cooperative agreement further specifies sectoring of a coverage area of each controller in the plurality of controllers, wherein the coverage area of each controller is divided into at least three sectors, and
        wherein specifying the cooperative agreement comprises:
        assigning each sector in the coverage area to one of at least three sector groups;
        partitioning each sector in each sector group into a number of subzones;
        sharing partitioning information with the other controllers in the plurality of controllers; and
        setting communications parameters for each subzone of each sector of each sector group in accordance with the shared partitioning information.

2. The method of claim 1, further comprising transmitting a portion of the cooperative agreement to the communications device.

3. The method of claim 1, further comprising notifying the communications device of the scheduled transmission opportunity.

4. The method of claim 1, wherein the indicator indicates a flexibility in transmission opportunity assignment, and wherein the indicator is based on link gain imbalances of channels between the communications device and controllers in the plurality of controllers, and a specified logical expression.

5. The method of claim 1, wherein the indicator comprises a classification value indicating a flexibility in transmission opportunity assignment, wherein multiple indicators are received from a plurality of communications devices, and wherein scheduling a transmission opportunity comprises:
    sorting the plurality of communications devices based on the multiple indicators; and scheduling transmission opportunities for each communications device in the sorted plurality of communications devices.

6. The method of claim 1, wherein the transmit power configuration specifies a power level, or a procedure for determining the power level, at which the communications device performs the transmission, and
wherein the step of coordinating with other controllers in the plurality of controllers to establish a cooperative agreement comprises communicating directly with the other controllers in the plurality of controllers in a distributed fashion, and not through a centralized controller.

7. The method of claim 1, wherein the plurality of controllers are base stations in a wireless network.

8. A method for interference mitigation by a controller, wherein the controller is one of a plurality of controllers, the method comprising:
coordinating with other controllers in the plurality of controllers to establish a cooperative agreement;
receiving a message from a communications device served by the controller, wherein the message comprises an indicator of operating conditions of the communications device;
scheduling a transmission opportunity for the communications device based on the indicator and the cooperative agreement; and
receiving a transmission from the communications device at the scheduled transmission opportunity,
wherein the controller operates in a communications system,
wherein coordinating comprises specifying the cooperative agreement based on an arrangement of the communications system, a sectoring of a coverage area of each controller in the plurality of controllers, a communications system resource configuration, a transmit power configuration, an inter-cell interference mitigation technique configuration, or combinations thereof,
wherein the coverage area of each controller is divided into at least three sectors,
wherein specifying the cooperative agreement comprises:
placing each sector in the coverage area into one of at least three sector groups;
partitioning each sector in each sector group into a number of subzones;
cooperating with the other controllers in the plurality of controllers to share partitioning information; and
setting communications parameters for each subzone of each sector of each sector group based on the shared partitioning information, and
wherein there are six subzones per sector, and wherein the communications parameters comprise a pilot pattern to transmit, a target interfering sector, a first transmission headroom for use in a default subzone, a second transmission headroom for use in an alternate subzone, and a subzone type.

9. The method of claim 8, wherein the cooperative agreement comprises elements defined as

| Sector Group Index | Subzone | | | | | |
|---|---|---|---|---|---|---|
| | 1A | 1B | 2A | 2B | 3A | 3B |
| 0 | A, 2, | A, 2, | B, 2, | B, 2, | A, 1, | A, 1, |
| 1 | $P_{01}$, $S_{01}$, C, A, 1, $P_{11}$, $S_{11}$, N | $P_{02}$, $S_{02}$, F, A, 1, $P_{12}$, $S_{12}$, L | $P_{03}$, $S_{03}$, C, A, 2, $P_{13}$, $S_{13}$, C | $P_{04}$, $S_{04}$, F, A, 2, $P_{14}$, $S_{14}$, F | $P_{05}$, $S_{05}$, N, B, 2, $P_{15}$, $S_{15}$, C | $P_{06}$, $S_{06}$, L, B, 2, $P_{16}$, $S_{16}$, F |
| 2 | B, 2, $P_{21}$, $S_{21}$, C | B, 2, $P_{22}$, $S_{22}$, F | A, 1, $P_{23}$, $S_{23}$, N | A, 1, $P_{24}$, $S_{24}$, L | A, 2, $P_{25}$, $S_{25}$, C | A, 2, $P_{26}$, $S_{26}$, F | where each element comprises at least one of the following values:
a first value that indicates whether the communications device uses a first pilot (A) or a second pilot (B) when performing transmissions in that subzone,
a second value that indicates which interfering sector is to be targeted by the communications device when performing open loop power control, the second value being equal to 1 indicates that the communications device applies power control to a dominant interference sector, and the second value being equal to 2 indicates that the communications device applies power control to a next-most dominant interference sector,
a third value that indicates a first transmission headroom to be applied if the transmission opportunity is in a default subzone for the indicator provided by the communications device,
a fourth value that indicates a second transmission headroom to be applied if the transmission opportunity is in an alternate subzone for the indicator provided by the communications device, and
a fifth value that indicates a subzone type.

10. The method of claim 9, wherein subzone type includes Normal (N), Cooperative (C), Fractional Frequency Reuse (R), and Low Power (L).

11. A method for interference mitigation by a communications device, wherein the communications device is served by a serving controller that is one of a plurality of controllers, the method comprising:
receiving configuration information from the serving controller;
measuring channels between the communications device and controllers in a subset of the plurality of controllers, the subset including the serving controller;
computing a first indicator of operating conditions at the communications device based on the measured channels and the configuration information;
transmitting the first indicator to the serving controller;
receiving a second indicator from the serving controller, the second indicator indicating an assigned transmission opportunity; and
transmitting to the serving controller at the assigned transmission opportunity, wherein computing a first indicator comprises:
computing link gain imbalances for the measured channels; and
setting the first indicator to a feedback value selected from a set of feedback values based on an application of a logical expression to the computed link gain imbalances, and wherein the set of feedback values and the logical expression comprise

| Feedback Value | Logical Expression | Preferred Subzone Type |
|---|---|---|
| 000 | $LGI_{12} >= c_0$ | N |
| 001 | $LGI_{12} >= c_1$ | N |
| 010 | $LGI_{12} < c_3, LGI_{23} > c_3,$ $s_1 = \mod(s_0 + 1, 3)$ | C |
| 011 | $LGI_{12} < c_3, LGI_{23} > c_3,$ $s_1 = \mod(s_0 + 2, 3)$ | C |
| 100 | $LGI_{12} < c_3, LGI_{23} < c_3,$ $s_1 = \mod(s_0 + 1, 3)$ $s_2 = \mod(s_0 + 2, 3)$ | F |
| 101 | $LGI_{12} < c_3, LGI_{23} < c_3,$ $s_1 = \mod(s_0 + 2, 3)$ $s_2 = \mod(s_0 + 1, 3)$ | F |
| 110 | $LGI_{12} >= c_2$ | N |
| 111 | $LGI_{12} < c_2$ | N | where $LGI_{xy}$ is a link gain imbalance between a first channel between the communications device and a controller x and a second channel between the communications device and a controller y, wherein controllers x and y are controllers in the subset of controllers, $c_z$ is a z-th constant, $s_y$ is an index to a y-th sector group, and a preferred subzone type includes Normal (N), Cooperative (C), Fractional Frequency Reuse (R), and Low Power (L).

12. A user equipment (UE) in a wireless network, the UE comprising:
a processor; and
a computer readable storage medium storing programming for execution by the processor, the programming including instructions to:
perform channel estimation on a plurality of pilot signals, the plurality of pilot signals including a serving pilot signal transmitted by a serving base station and two or more interfering pilot signals transmitted by two or more neighboring base stations;
compute a link gain imbalance indicator in accordance with the channel estimation, wherein the link gain imbalance indicator specifies link gain differences amongst individual ones of the plurality of pilot signals, the link gain imbalance indicator specifying at least a first link gain difference between the serving pilot signal and a strongest one of the two or more interfering pilot signals, and a second link gain difference between the strongest interfering pilot signal and a second strongest one of the two or more interfering pilot signals; and
communicate the link gain imbalance indicator to the serving base station.

13. The UE of claim 12, wherein the link gain imbalance indicator further specifies a third link gain difference between the second strongest interfering pilot signal and a third strongest one of the two or more interfering pilot signals.

14. The UE of claim 12, wherein the link gain imbalance indicator lists the link gain differences in descending order.

15. The UE of claim 12, wherein the link gain imbalance indicator comprises a sorted descending-order link gains (SDLG) vector that lists a plurality of link gains corresponding to the plurality of pilot signals in descending order.

16. A base station in a wireless network, the base station comprising:
a processor; and
a computer readable storage medium storing programming for execution by the processor, the programming including instructions to:
receive a link gain imbalance indication from a mobile station, wherein the link gain imbalance indication is computed by the mobile station in accordance with channel estimations performed on a plurality of pilot signals, wherein the link gain imbalance indication specifies link gain differences amongst individual ones of the plurality of pilot signals, the link gain imbalance indication specifying at least a first link gain difference between the serving pilot signal and a strongest one of two or more interfering pilot signals, and a second link gain difference between the strongest interfering pilot signal and a second strongest one of the two or more interfering pilot signals; and
coordinate with one or more of the plurality of neighboring base stations in the wireless network to reach a cooperative agreement for reducing inter-cell-interference in the wireless network, wherein at least some parameters of the cooperative agreement are configured in accordance with the link gain differences.

17. The base station of claim 16, wherein the cooperative agreement specifies a transmission power configuration for one or more regions in the wireless network,
wherein the transmission power configuration reduces inter-cell-interference in the wireless network in accordance with a power-limited fractional frequency re-use (FFR) scheme that specifies power settings for the one or more regions.

18. The base station of claim 16, wherein the cooperative agreement specifies a successive interference cancellation (SIC) scheme that requires joint participation by two or more of the neighboring base stations.

19. The base station of claim 16, wherein the cooperative agreement specifies a coordinated beam switching configuration such that a first user in a first cell is served by a first one of the plurality of neighboring base stations simultaneous to a second user in a second cell being served by a second one of the plurality of neighboring base stations, and
wherein the coordinated beam switching configuration is such that the second user is outside a first main beam of a first cell pattern in the first cell, and the first user is outside a second main beam of a second cell pattern in the second cell.

20. A method comprising:
receiving, by a user equipment (UE), a plurality of pilot signals including a serving pilot signal transmitted by a serving base station and two or more interfering pilot signals transmitted by two or more neighboring base stations;
computing, by the UE, a link gain imbalance indicator specifying link gain differences amongst individual ones of the plurality of pilot signals, wherein the link gain imbalance indicator specifies at least a first link gain difference between the serving pilot signal and a strongest one of the two or more interfering pilot signals, and a second link gain difference between the strongest interfering pilot signal and a second strongest one of the two or more interfering pilot signals; and
communicating, by the UE, the link gain imbalance indicator to the serving base station.

21. The method of claim 20, wherein the link gain differences further include a third link gain difference between the second strongest interfering pilot signal and a third strongest one of the two or more interfering pilot signals.

22. The method of claim 20, wherein the link gain imbalance indicator lists the link gain differences in descending order.

23. The method of claim 20, wherein the link gain imbalance indicator comprises a sorted descending-order link gains (SDLG) vector that lists a plurality of link gains corresponding to the plurality of pilot signals in descending order.

* * * * *